Sept. 21, 1954     R. C. CORNELL ET AL     2,689,408
DEPTH GAUGE
Filed Oct. 9, 1950     2 Sheets-Sheet 1
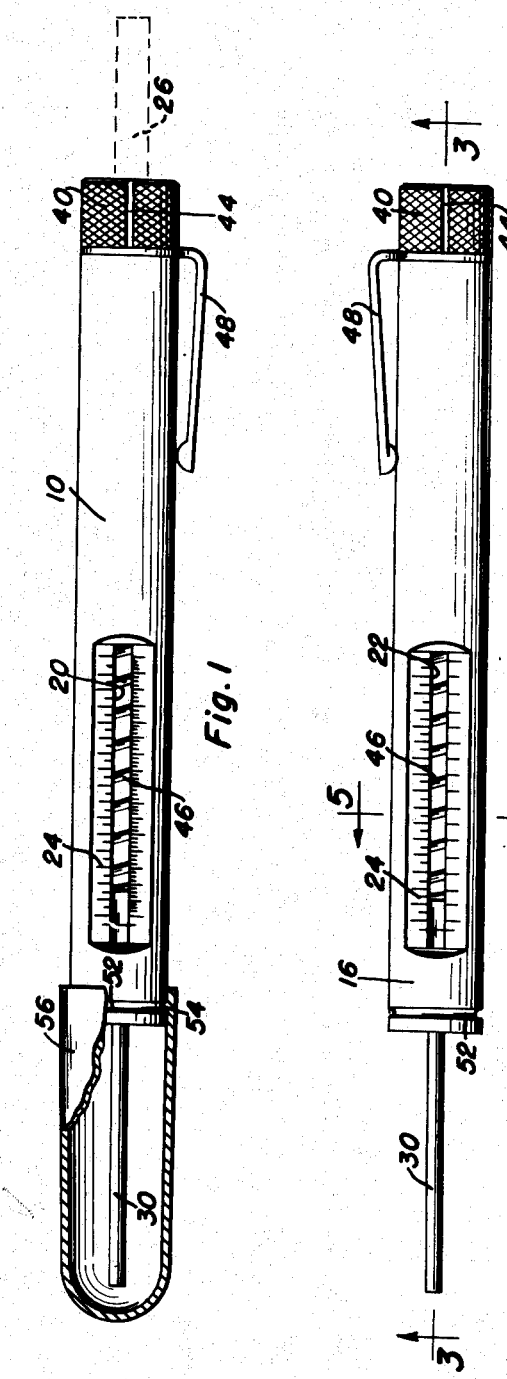
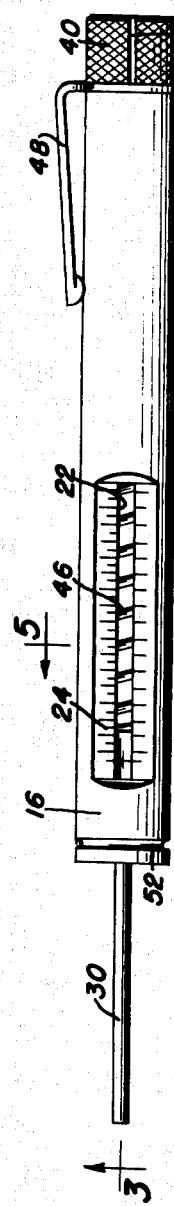
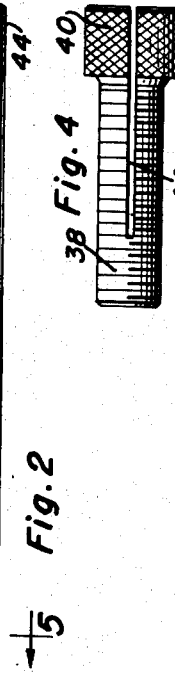
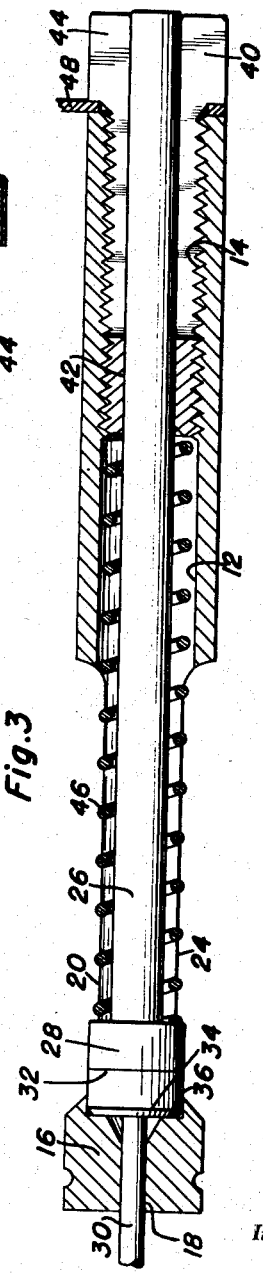
Inventors
Roy C. Cornell
Jack E. Dean
By *Clarence A. O'Brien*
*and Harvey B. Jackson*
Attorneys Sept. 21, 1954
R. C. CORNELL ET AL
2,689,408
DEPTH GAUGE
Filed Oct. 9, 1950
2 Sheets-Sheet 2
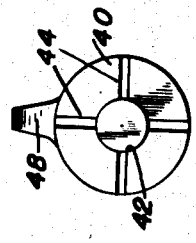
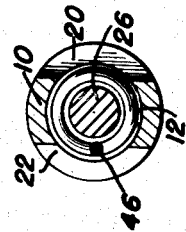
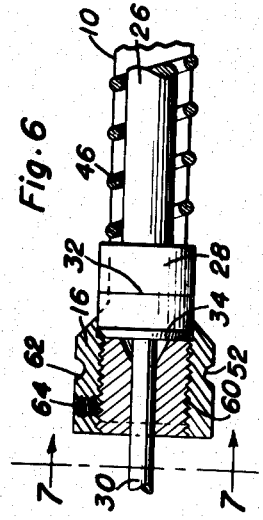
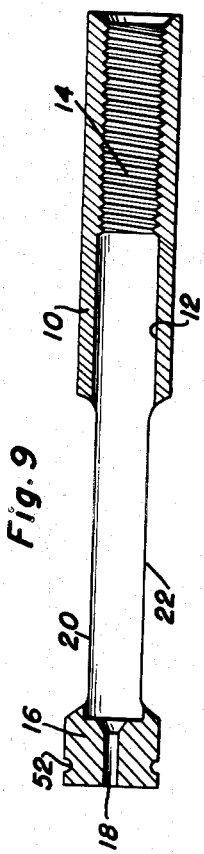
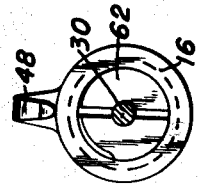
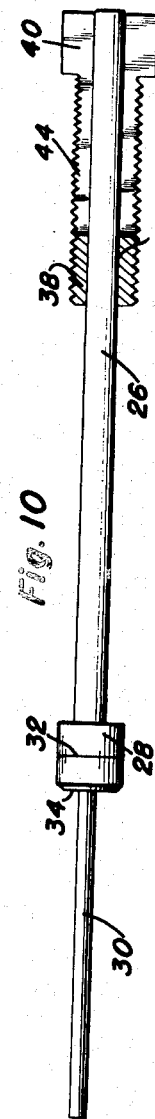
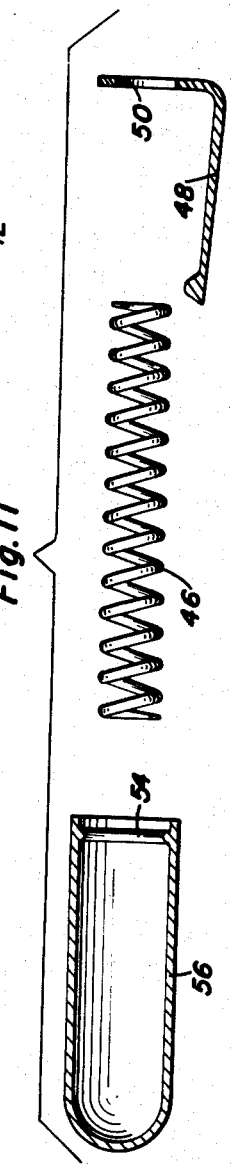
Inventors
Roy C. Cornell
Jack E. Dean
By
*Attorneys*

Patented Sept. 21, 1954

2,689,408

UNITED STATES PATENT OFFICE 2,689,408

DEPTH GAUGE

Roy C. Cornell, Grand Rapids, and Jack E. Dean, Cascade, Mich.

Application October 9, 1950, Serial No. 189,192

1 Claim. (Cl. 33—169)

This invention comprises novel and useful improvements in a depth gauge, and more specifically pertains to a pocket size gauge for quickly and accurately ascertaining the depths of blind holes or bores.

The primary object of this invention is to provide an improved depth gauge of a compact size for conveniently carrying the same in the pocket of a mechanic, and which is capable of gauging the depths of blind holes and bores with accuracy and precision.

A further object of the invention is to provide a depth gauge in conformity with the foregoing object in which the indication of the depth gauged may be ascertained with facility; and wherein the gauge may be locked in its gauged position to facilitate the taking of measurements and comparison of the same.

Yet another object of the invention is to provide an improved depth gauge in accordance with the foregoing objects wherein improved means are provided for quickly, easily and with certainty locking the device in its gauged position.

A still further object of the invention is to provide an improved depth gauge as set forth in the above-mentioned objects, wherein a minimum number of parts are provided, wherein the device shall be sufficiently compact for use in gauging the depths of small bores and for storing in the pocket of the user; and wherein the idle or rest position of the gauge may be readily adjusted as required.

And a final important object of the invention to be specifically enumerated herein is to provide a depth gauge of the pocket pencil type having a retaining clip and a protective casing for the end of the gauge.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a side elevational view, a part of the cap being broken away, of a preferred construction of depth gauge incorporating therein the principles of this invention, the gauging element being indicated in its rest or idle position in full lines and in one of its gauging positions in dotted lines therein;

Figure 2 is a view of the depth gauge shown in Figure 1, the gauge being rotated through 180° to show the other side thereof and the cap being removed therefrom;

Figure 3 is a horizontal sectional view taken substantially upon the plane indicated by the section line 3—3 of Figure 2, showing the internal construction of the gauge, a part of the gauge rod being broken away;

Figure 4 is an elevational view of the gauge locking device;

Figure 5 is a vertical transverse sectional view taken substantially upon the plane indicated by the section line 5—5 of Figure 2;

Figure 6 is a fragmentary horizontal sectional view similar to Figure 3, but showing a slightly modified construction of the body of the gauge;

Figure 7 is a vertical transverse sectional view taken substantially upon the plane indicated by the section line 7—7 in Figure 6;

Figure 8 is an end elevational view of the gauge shown in Figures 1–3 and taken from the right end thereof;

Figure 9 is a horizontal sectional view through the body portion of the gauge;

Figure 10 is an elevational view of the movable rod element of the gauge, the locking device being shown applied thereto and shown in section; and Figure 11 is a group assembly view showing the relative position of the gauge cap, the gauge retaining clip and the gauge spring.

Referring now more specifically to the accompanying drawings, wherein like numerals designate similar parts throughout the various views, it will be seen that the improved gauge embodying therein the principles of this invention consist of a generally cylindrical or tubular gauge body 10 of any suitable material, which body is provided with a cylindrical bore or chamber 12 therein, the body being open at its outer end and being internally threaded, as at 14, while at its inner end the body has an end portion 16 which is bored, as at 18.

Adjacent its inner end, the gauge body is provided with longitudinally extending, oppositely disposed cutaway portions or slots 20 and 22, which, adjacent their edges, are provided with suitable gauging indicia 24.

The internal chamber 12 of the body slidably receives the upper portion 26 of a gauge rod which has a cylindrical collar 28 intermediate its ends, and a lower diametrically reduced portion 30 constituting the gauging element which is slidably received in the bore 18. The rod 26, together with the collar 28 is reciprocable within the chamber 12 between the end portion 16 thereof and a closure constituting a locking member disposed in the outer end of the body, as set forth hereinafter.

It is contemplated that the gauge rod 30 may be integrally connected with the collar 28 if desired; or that a series of gauge rods of different lengths may be detachably secured to the collar 28, as by a screw-threaded engagement therewith.

The collar 28 is provided with a circumferentially extending line 32 which constitutes an index or gauge line adapted to register with the indicia 24 appearing adjacent the slots 20 and 22.

At its outer end, the collar 28 is preferably bevelled as at 34 in order to facilitate the sliding movement of the collar through the chamber 12 and also to enable the collar to seat itself readily in a shouldered recess 36 formed in the adjacent surface of the end wall 16 of the body.

This shouldered recess constitutes a stop shoulder while the collar 28 itself constitutes a stop to thereby limit the relative outward sliding movement of the gauge rod 30 with respect to the gauge body.

The internal screw threads 14 at the outer end of the chamber 12 at the outer end of the body 10 are adapted to receive a locking member, in the form of a sleeve or bolt 38 which is externally threaded and is provided with a knurled finger grip headed portion 40. An axial bore 42 extends through this bolt or locking member for slidably receiving the gauge rod 26, and at its outer end the locking bolt is provided with a plurality of diametrically disposed slots 44 which impart resiliency to the member.

The arrangement is such that when the locking member is screwed entirely or to fully seated position within the internally threaded portion of the body, the slotted portion will be forced together to cause the same to firmly clamp upon or grip the gauge rod 26 to prevent sliding movement of the rod through the bore 42; while when the locking member is screwed outwardly of the body to permit the slotted portion to expand, the gauge rod will be free to slide through the bore 42.

A compression spring 46 surrounds the rod 26 and terminally abuts against the collar 28 and the end of the locking member 38. This spring yieldingly urges the rod element 30 outwardly of the body and urges the collar 28 into its seated position in the socket or shoulder 36. At that time, the index line 32 on the collar will normally engage the innermost of the indicia 24 which are disposed adjacent the slots 20 and 22; thus indicating that the gauge is positioned for its maximum gauging operation. As the gauge rod 30 is pressed into the bore to be measured, until the end portion 16 of the body 10 abuts against the upper surface of the bore, it is evident that the rod 26 will be moved upwardly in the body against the resistance of the spring 46 and will be slid through the bore 42 of the locking member 38. Obviously, the reference line 32 will move across the indicia 24, whereby the exact depth of the bore may be readily ascertained. However, when the gauge is in proper gauging position, as above mentioned, the locking member 38 may be rotated to cause the same to lock upon the gauge rod and thereby prevent its movement when the gauge is removed from the hole or bore to be measured.

In order to facilitate carrying of the gauge and protecting the same during such transportation, a conventional form of clip 48 is provided, the same having a fastening aperture 50 which is adapted to encircle the threaded shank of the locking member 38 and be retained between the headed portion 40 thereof and the end of the body 10, as will be apparent from the drawings. At its other end, the body is provided with a peripheral groove 52, which is adapted to be resiliently engaged by an internally extending annular rib 54 formed upon the cup-shaped or thimble-shaped closure sleeve 56. This sleeve serves to protect the relatively delicate end of the gauge rod 30 from being bent or otherwise damaged when not in use.

The above described gauge has a fixed range of travel with regard to the indicia 24. However, as shown in Figure 6, it is possible to provide an adjusting means for this range of travel. Thus, the end portion 16 of the gauge body 10 may be provided with an internally threaded bore 60 in which is received an externally threaded plug 62 which may be locked in longitudinally adjusted position, as by a set screw 64. This end portion 16 has the above-mentioned peripheral groove 52 for the reception of the protecting cap. The end surface of the plug 62 itself constitutes the bottom of the socket or recess 36 previously mentioned, and provides a means whereby the outward movement of the collar 28 of the gauge rod may be adjustably limited to thereby selectively position the reference indicia 32 with respect to the other indicia of the gauge.

The operation of this form of the invention is, of course, identical with that previously described.

Since, from the foregoing, the construction and advantages of this depth gauge are readily apparent, further description is believed to be unnecessary.

However, since numerous modifications and equivalents will readily occur to those skilled in the art after a consideration of the foregoing specification and accompanying drawings, it is not intended to limit the invention to the exact embodiment shown and described, but all suitable modifications and equivalents may be resorted to which fall within the scope of the appended claim.

Having described the invention, what is claimed as new is:

A depth gauge comprising a body having a bore extending therethrough and having an inspection opening extending through said body into said bore, a gauge rod slidably received in said body and having its ends extending beyond both ends of said body, a spring in said bore urging the rod from said body, means at one end of said body for locking said rod in adjusted positions and journaling and guiding one end of the rod for sliding movement, means in the other end of said body for journaling and guiding the other end of said rod for sliding movement, a collar on said rod having an index visible at said inspection opening and guiding said rod for sliding movement in said bore, said other end of said body having a recess for receiving the end of said collar, the latter having a beveled edge for entering and seating in said recess.

References Cited in the file of this patent

UNITED STATES PATENTS

| Number | Name | Date |
| --- | --- | --- |
| 379,423 | Spencer | Mar. 13, 1888 |
| 716,279 | Rieffel | Dec. 16, 1902 |
| 763,076 | Spalding | June 21, 1904 |
| 1,235,785 | Fishel | Aug. 7, 1917 |
| 1,455,973 | Sikorovsky | May 22, 1923 |
| 2,024,021 | Aldeborgh | Dec. 10, 1935 |
| 2,400,371 | Reeser | May 14, 1946 |
| 2,619,727 | Krohn | Dec. 2, 1952 |

FOREIGN PATENTS

| Number | Country | Date |
| --- | --- | --- |
| 248,521 | Switzerland | Feb. 2, 1948 |

OTHER REFERENCES

Publication, American Mach., p. 119, October 2, 1950. (Copy in Pat. Office Library.)